(12) United States Patent
Metz et al.

(10) Patent No.: US 7,176,391 B2
(45) Date of Patent: Feb. 13, 2007

(54) LOAD CELL TO FRAME INTERFACE FOR HOSPITAL BED

(75) Inventors: Darrell L. Metz, Batesville, IN (US); Gregory J. Figel, Sunman, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 11/210,653

(22) Filed: Aug. 24, 2005

(65) Prior Publication Data

US 2006/0059814 A1 Mar. 23, 2006

Related U.S. Application Data

(60) Provisional application No. 60/609,484, filed on Sep. 13, 2004.

(51) Int. Cl.
*G01G 19/52* (2006.01)
*A47B 71/00* (2006.01)

(52) U.S. Cl. .................. 177/144; 177/DIG. 9
(58) Field of Classification Search ........... 177/144, 177/DIG. 9
See application file for complete search history.

(56) References Cited

U.S. PATENT DOCUMENTS

| | | | |
|---|---|---|---|
| 2,990,899 A | 7/1961 | De Bella | |
| 3,217,818 A | 11/1965 | Engelsher et al. | |
| 3,338,323 A | 8/1967 | Swersey | |
| 3,360,062 A | 12/1967 | Potter | |
| 3,512,595 A | 5/1970 | Laimins | |
| 3,656,478 A | 4/1972 | Swersey | |
| 3,722,611 A | 3/1973 | Tirkkonen | |
| 3,741,328 A | 6/1973 | Andersson et al. | |
| 3,773,124 A | 11/1973 | Bullivant | |
| 3,795,284 A | 3/1974 | Mracek et al. | |
| 3,876,018 A | 4/1975 | Mracek et al. | |
| 3,961,675 A | 6/1976 | Siegel | |
| 3,998,790 A | 12/1976 | Brändström et al. | |
| 4,006,789 A | 2/1977 | Stultz et al. | |
| 4,015,677 A | 4/1977 | Silva et al. | |
| 4,023,633 A | 5/1977 | Swersey et al. | |
| 4,033,420 A | 7/1977 | De Masters | |
| D248,928 S | 8/1978 | Grunstad | |
| 4,134,467 A | 1/1979 | Czyryk | |
| 4,215,754 A | 8/1980 | Hagedorn et al. | |
| 4,281,730 A | 8/1981 | Swersey et al. | |
| 4,286,679 A | 9/1981 | Schneider | |
| 4,363,368 A | 12/1982 | Paddon et al. | |

(Continued)

FOREIGN PATENT DOCUMENTS

EP 0 838 659 A2 4/1988

(Continued)

*Primary Examiner*—Randy W. Gibson
(74) *Attorney, Agent, or Firm*—Barnes & Thornburg LLP

(57) ABSTRACT

A load cell apparatus has a load cell adapted to couple to a first structure. The load cell comprises a load cell body and a sensor. The sensor provides an output signal indicative of an amount of weight applied to the load cell. A stud extends away from the load cell body. The load cell apparatus has a stud receiver including a space in which a portion of the stud is received. A set of rollers are coupled to one of the stud receiver and a second structure and contact the other of the stud receiver and the second structure.

40 Claims, 5 Drawing Sheets

U.S. PATENT DOCUMENTS

| | | | |
|---|---|---|---|
| 4,363,369 A * | 12/1982 | Susor | 177/163 |
| 4,411,327 A | 10/1983 | Lockery et al. | |
| 4,438,823 A | 3/1984 | Hussels et al. | |
| 4,483,404 A | 11/1984 | Weihs | |
| 4,487,276 A | 12/1984 | Swersey et al. | |
| 4,492,281 A | 1/1985 | Van Allen et al. | |
| 4,539,560 A | 9/1985 | Fleck et al. | |
| 4,540,057 A | 9/1985 | Freeman | |
| 4,550,793 A | 11/1985 | Giles | |
| 4,551,882 A | 11/1985 | Swersey et al. | |
| 4,554,987 A | 11/1985 | Dillon | |
| 4,572,006 A | 2/1986 | Wolfendale | |
| 4,600,066 A | 7/1986 | Griffen et al. | |
| 4,601,356 A | 7/1986 | Muccillo, Jr. | |
| 4,623,029 A | 11/1986 | Bambauer et al. | |
| 4,629,015 A | 12/1986 | Fried et al. | |
| 4,638,876 A * | 1/1987 | Balduin et al. | 177/139 |
| 4,649,759 A | 3/1987 | Lee | |
| 4,738,325 A | 4/1988 | Bullivant et al. | |
| 4,751,754 A | 6/1988 | Bailey et al. | |
| 4,757,867 A * | 7/1988 | Rosenthal et al. | 177/255 |
| 4,763,740 A | 8/1988 | Pattern | |
| 4,793,428 A | 12/1988 | Swersey | |
| 4,880,069 A * | 11/1989 | Bradley | 177/211 |
| 4,899,600 A | 2/1990 | Lee | |
| 4,899,840 A | 2/1990 | Boubille | |
| 4,926,951 A | 5/1990 | Carruth et al. | |
| 4,934,468 A | 6/1990 | Koerber, Sr. et al. | |
| 4,953,244 A | 9/1990 | Koerber, Sr. et al. | |
| 4,961,470 A | 10/1990 | Koerber, Sr. | |
| 4,974,692 A | 12/1990 | Carruth et al. | |
| 5,173,977 A | 12/1992 | Carruth et al. | |
| 5,183,126 A | 2/1993 | Kellenbach | |
| 5,224,561 A | 7/1993 | Ahl | |
| 5,269,388 A | 12/1993 | Reichow et al. | |
| 5,276,432 A | 1/1994 | Travis | |
| 5,359,902 A | 11/1994 | Barger et al. | |
| 5,393,935 A | 2/1995 | Hasty et al. | |
| RE35,301 E | 7/1996 | Reichow | |
| 5,545,984 A | 8/1996 | Gloden et al. | |
| 5,600,104 A | 2/1997 | McCauley et al. | |
| 5,636,394 A | 6/1997 | Bartley | |
| 5,672,849 A | 9/1997 | Foster et al. | |
| 5,715,548 A | 2/1998 | Weismiller et al. | |
| 5,747,745 A | 5/1998 | Neuman | |
| 5,771,511 A | 6/1998 | Kummer et al. | |
| 5,801,339 A | 9/1998 | Boult | |
| 5,823,278 A | 10/1998 | Geringer | |
| 5,827,981 A | 10/1998 | March | |
| 5,831,221 A | 11/1998 | Geringer et al. | |
| 5,859,390 A | 1/1999 | Stafford et al. | |
| 5,861,581 A | 1/1999 | Evans et al. | |
| 5,864,295 A | 1/1999 | Jarocha | |
| 5,906,016 A | 5/1999 | Ferrand et al. | |
| 5,910,647 A | 6/1999 | Kats et al. | |
| 5,988,676 A | 11/1999 | Lotito et al. | |
| 6,026,694 A | 2/2000 | Gray | |
| 6,150,619 A | 11/2000 | Borngasser | |
| 6,166,336 A | 12/2000 | Odiet | |
| 6,208,250 B1 | 3/2001 | Dixon et al. | |
| 6,320,510 B2 | 11/2001 | Menkedick et al. | |
| 6,321,878 B1 | 11/2001 | Mobley et al. | |
| 6,362,439 B1 | 3/2002 | Reichow | |
| 6,438,776 B2 | 8/2002 | Ferrand et al. | |
| 6,680,443 B2 | 1/2004 | Dixon | |
| 6,924,441 B1 | 8/2005 | Mobley et al. | |

FOREIGN PATENT DOCUMENTS

| | | |
|---|---|---|
| EP | 0 322 994 | 5/1989 |
| EP | 0 744 598 A1 | 11/1996 |
| WO | WO 00/51541 | 9/2000 |
| WO | WO 01/23847 | 4/2001 |

* cited by examiner

LOAD CELL TO FRAME INTERFACE FOR HOSPITAL BED

This application claims the benefit, under 35 U.S.C. § 119(e), of U.S. Provisional Patent Application Ser. No. 60/609,484 which was filed Sep. 13, 2004 and which is hereby incorporated by reference herein in its entirety.

BACKGROUND OF THE INVENTION

The present disclosure relates generally to apparatuses, such as hospital beds, having integrated weighing systems. More particularly, the disclosure relates to interfaces between load cells of weigh scale systems and the structures which support the load cells.

Various apparatuses, such as patient support apparatuses, having weigh scale systems for weighing loads, such as patients, are known. Such weigh scale systems sometimes include load cells that deflect under an applied load. Some conventional load cells include a block (also known as a load beam) and one or more strain gages mounted to the block. Deflection of the block due to an applied load changes the shape of the strain gages resulting in a change in the resistance of the strain gages. Generally, a known input voltage is applied to the strain gages and an output signal from the strain gages varies as the resistance of the strain gages vary to provide a signal indicative of the load applied to the load cell. Some conventional load cells include other types of sensors, such as optical sensors or capacitive sensors, rather than strain gages, that measure the size of gaps between elements of a load cell system. It is desirable, of course, for load cells to sense applied loads with a high degree of accuracy and repeatability.

SUMMARY OF THE INVENTION

The present invention comprises one or more of the features recited in the appended claims and/or the following features which, alone or in any combination, may comprise patentable subject matter:

A combination may comprise a first structure, a second structure, and a load cell coupled to the first structure. The load cell may have a load cell body and a sensor. The sensor may provide an output signal indicative of an amount of weight applied to the load cell. A stud may extend away from the load cell body. A stud receiver may have a space in which a portion of the stud is received. A set of rollers may be coupled to one of the stud receiver and the second structure and the rollers may contact the other of the stud receiver and the second structure.

The sensor may comprise a strain gage, a resistive element, a capacitor, a transducer using shaped magnetic field technology, an optical sensor, a transducer that emits electromagnetic energy, a transducer that receives electromagnetic energy, a linear variable displacement transducer, or any other type of device that is operable to provide a signal indicative of an amount of weight applied to the load cell. The space may comprises a substantially cylindrical hole or a substantially triangular hole. The space may have a pair of inclined surfaces that contact the stud. The stud may have a cylindrical portion or a spherical portion. The cylindrical portion may have a stud diameter that is smaller than a diameter of the substantially cylindrical hole. The substantially triangular hole may have three apexes that are spaced-from the stud. The apexes of the triangular hole may be rounded. The load cell body may have a threaded hole and the stud may have a threaded portion that threads into the threaded hole. The stud receiver may rotate about the stud when the second structure tilts relative to the first structure. The stud receiver may be made of a plastic material and the stud may be made of a metal material.

The set of rollers may comprise one roller or multiple rollers. The set of rollers may roll upon the second structure when the second structure tilts relative to the first structure. The set of rollers may roll upon the stud receiver when the second structure tilts relative to the first structure. The stud may extend substantially horizontally relative to the load cell body along a first substantially horizontal axis and each of the set of rollers may rotate about a respective second substantially horizontal axis. The stud receiver may have at least one roller-receiving pocket in which at least a portion of each roller of the set of rollers is received. The stud receiver may comprise a horizontal wall underlying the at least one roller-receiving pocket. One or more vertical walls may be situated between the roller-receiving pockets. The roller-receiving pockets may each be open at a top surface and at a respective end surface of the stud receiver. Each roller of the set of rollers may extend upwardly beyond a top surface of the stud receiver.

The stud receiver may have a pair of vertical walls and at least part of each roller of the set of rollers may be situated between the pair of vertical walls. A set of shafts may extend across a gap defined between the pair of vertical walls and each roller of the set of rollers may be mounted for rotation on a respective shaft of the set of shafts. The combination may further comprise a set of bushings that are interposed between a respective roller of the set of rollers and the associated shaft. The combination may further comprise a set of bearings, each of which may have rolling elements and each of which may be interposed between a respective roller of the set of rollers and the associated shaft. The first and second vertical walls may have first and second holes, respectively, that receive ends of respective shafts. The first holes may each have a diameter that is larger than a diameter of the second holes. Each shaft of the set of shafts may have a shoulder that contacts the second vertical wall. The stud receiver may have a set of shaft retainers coupled to the first vertical wall. Each shaft retainer may be heat staked over an end of a respective shaft.

The combination may further comprise a bracket that couples the load cell body to the first structure. The bracket may have a bottom portion that underlies the load cell body and at least one side portion that extends between the bottom portion and the first structure. The side portion may be fastened to the first structure and the load cell body may be fastened to the bottom portion. The bracket may comprise a bottom portion and two side portions extending upwardly from the bottom portion such that the bracket is U-shaped in cross section. The load cell body may sit atop the bottom portion. At least part of the first structure may be situated above the load cell body and between the two side portions of the bracket.

The first structure may comprise a lift mechanism of a patient support apparatus and the second structure may comprises a frame of the patient support apparatus. The patient support apparatus may comprise a hospital bed. The patient support apparatus may have a length dimension defined between a head end and a foot end of the patient support apparatus and the stud may have an axis that is substantially perpendicular to the length dimension of the patient support apparatus. The lift mechanism may be extendable and retractable to change an elevation of the upper frame. The load cell body may be coupled to the lift mechanism so as to move upwardly and downwardly without tilting as the lift mechanism extends and retracts.

The lift mechanism may comprise a telescoping column and a frame member coupled to an upper region of the telescoping column. An end of the frame member of the lift mechanism may extend from the telescoping column toward a frame member of the upper frame. The load cell body may be coupled to the end of the frame member of the lift mechanism. The upper frame of the patient support apparatus may comprise a frame member having a C-shaped cross section defining a channel in which the stud receiver is situated. Thus, the frame member may comprise a top wall, a bottom wall, and a side wall extending between the top and bottom walls. The set of rollers may contact an undersurface of the top wall of the frame member. The lift mechanism may be operable to change the elevation of the upper frame and, as the upper frame changes elevation, the set of rollers my roll on the undersurface of the top wall.

In accordance with this disclosure, a patient support apparatus may have a base frame, an upper frame above the base frame, and a pair of lift mechanisms operable to raise, lower, and tilt the upper frame relative to the base frame. A first pair of load cell assemblies may couple one of the lift mechanisms to the upper frame and a second pair of load cell assemblies may couple the other of the lift mechanisms to the upper frame. Each load cell assembly of the first pair of load cell assemblies may comprise a load cell coupled to the first lift mechanism and a rolling carrier. The rolling carrier may have a carrier body and a set of rollers coupled to the carrier body and contacting the upper frame. The rollers may roll upon the upper frame when the upper frame is tilted relative to the base frame. Alternatively, a set of rollers may be coupled to the upper frame and roll upon the rolling carrier when the upper frame is tilted relative to the base frame. Each load cell assembly of the second pair of load cell assemblies may comprise a load cell coupled to the second lift mechanism and a fixed carrier coupled to the frame. Each load cell may comprise a load cell body and a stud extending from the load cell body. Each of the rolling carriers and fixed carriers may have a space that receives the respective stud. The rolling carriers and the fixed carriers may pivot relative to the respective studs when the upper frame is tilted relative to the base frame.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Load cell apparatuses are described herein as being used in a weighing system of a patient support apparatus, such as a hospital bed. However, the load cell apparatuses described herein are not limited to use in patient support apparatuses and those skilled in the art will appreciate that the load cell apparatuses disclosed herein may be used in a wide variety of applications where loads are sensed.

Figure 1:
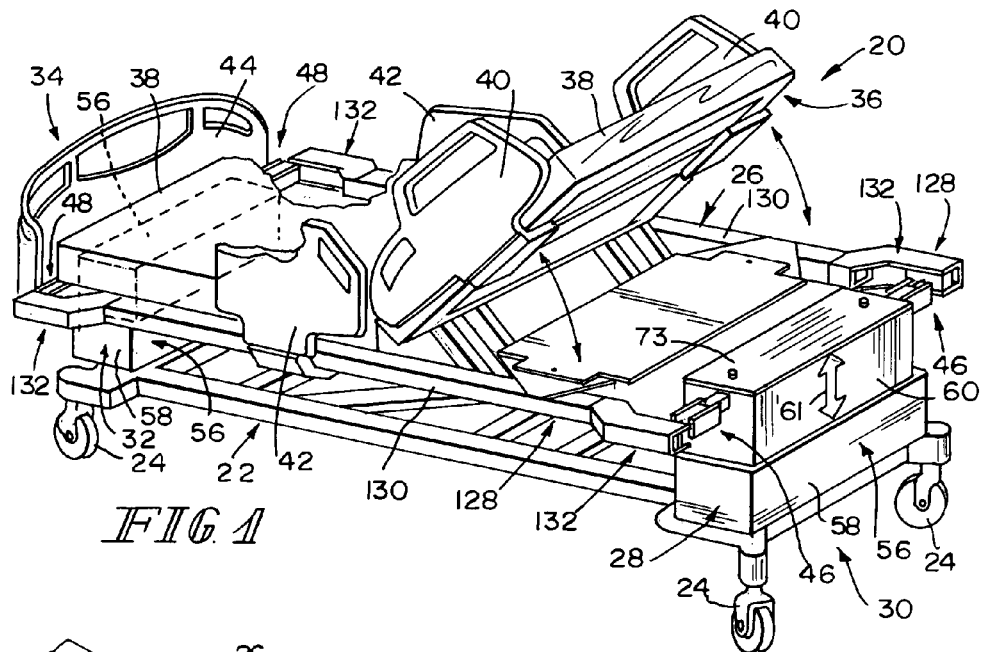
FIG. 1 is a perspective view, with portions broken away, showing a hospital bed having a base frame, a pair of lift mechanisms at ends of the base frame, an upper frame carrying an articulated patient-support deck, and a plurality of load cell assemblies connecting the upper frame to the lift mechanisms.

According to this disclosure, a patient support apparatus 20 has a base frame 22 to which a plurality of casters 24 are coupled, an upper frame 26 above base frame 22, a first lift mechanism 28 near a head end 30 of apparatus 20, and a second lift mechanism 32 near a foot end 34 of apparatus 20 as shown in FIG. 1. Illustrative apparatus 20 is a hospital bed and therefore, apparatus is sometimes referred to herein as "bed 20." However, the teachings of this disclosure are applicable to all sort of devices that carry loads including other types of patient support apparatuses, such as stretchers, operating room tables, chairs, infant incubators, radiant warmers, imaging tables, and the like.

Illustrative bed 20 further comprises an articulated patient support deck 36 which carries a support surface 38, such as a mattress, as shown in FIG. 1. Bed 20 also has a first pair of siderails 40 coupled to a head section of deck 36, a second pair of siderails 42 coupled to frame 26, and a footboard 44 coupled to frame 26 near foot end 34 of bed 20. Siderails 40, 42 are movable between respective raised positions, shown in FIG. 1, in which at least portions of siderails 40, 42 extend above support surface 38, and lowered positions (not shown), in which siderails are below support surface 38 to facilitate patient egress from, and ingress onto, support surface 38.

Figure 4:
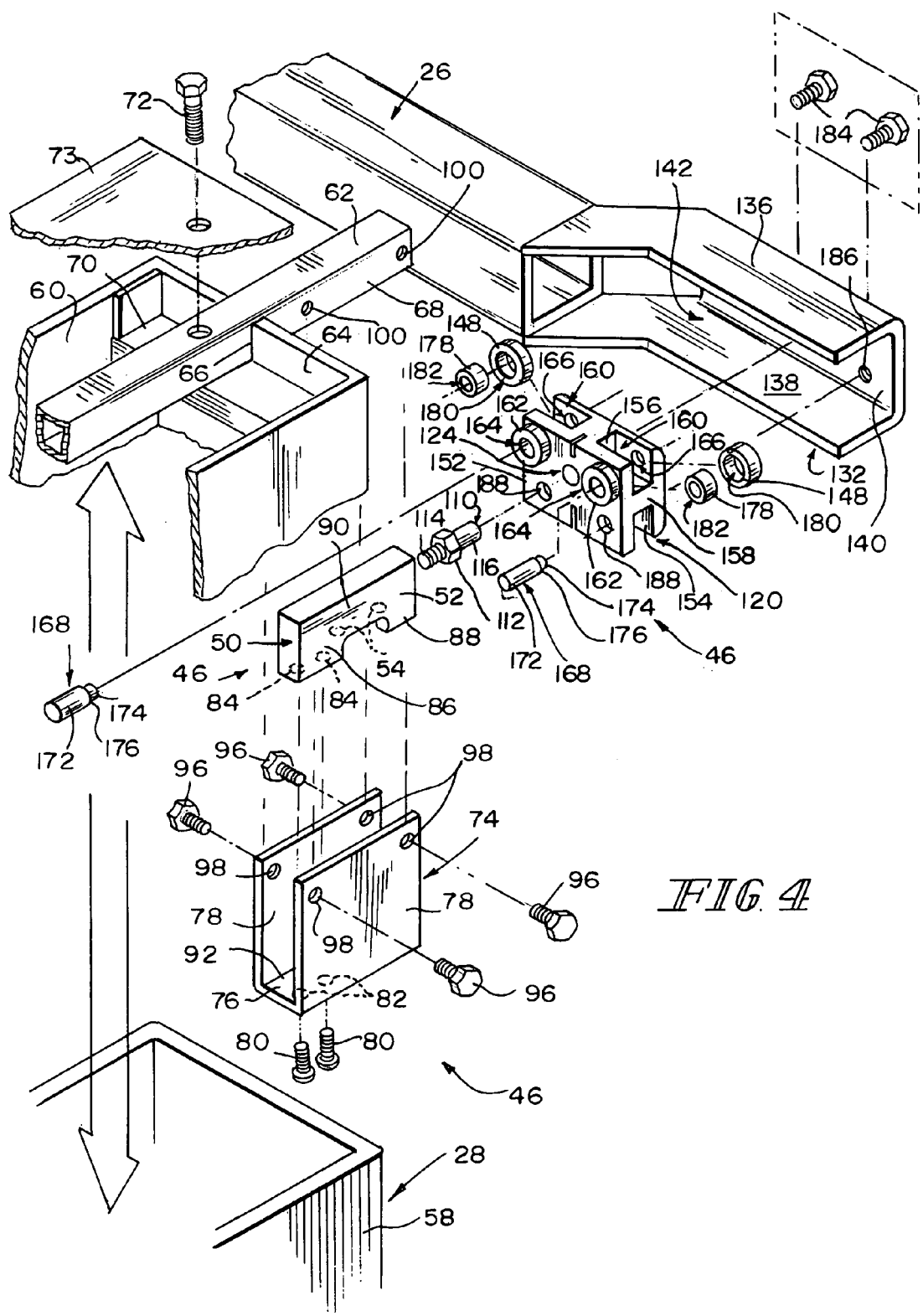
FIG. 4 is an exploded perspective view showing a portion of one of the lift assemblies, a portion of the upper frame, and the components of one of the load cells assemblies that interconnect the associated lift assembly with the upper frame.

Bed 20 includes a weighing system that is operable to weigh a patient supported on surface 38. The weighing system comprises a first pair of load cell assemblies 46 that couple to first lift mechanism 28 and to upper frame 26 adjacent head end 30 of bed 20 as shown in FIG. 1. The weighing system further comprises a second pair of load cell assemblies 48 that couple to second lift mechanism 32 and to upper frame 26 adjacent foot end 34 of bed 20. Assemblies 46, 48 each comprise a load cell 50 which, in turn, each comprise a load cell body 52 and one or more sensors 54 as shown in FIG. 4. In some embodiments, the sensors 54 of load cells 50 comprise one or more strain gages coupled to bodies 52. In such embodiments, the strain gages may include resistive elements arranged in a Wheatstone bridge configuration. In other embodiments, the sensors of load cells 50 comprise one or more of the following: a capacitor, a transducer using shaped magnetic field technology, an optical sensor, a transducer that emits electromagnetic energy, a transducer that receives electromagnetic energy, and a linear variable displacement transducer. Thus, this disclosure contemplates that sensors 54 of load cells 50 may be any type of device that is operable to provide a signal indicative of an amount of weight applied to load cells 50.

Due to the weight carried by load cells 50, including the weight of any patient supported on surface 38, load cell bodies 52 deflect. The deflection of bodies 52 is sensed by sensors 54 which provide output signals indicative of the amount of weight or load applied to the respective load cells 50. For example, in embodiments in which sensors 50 are strain gages, a known input voltage is applied to the strain gages and, as bodies 52 deflect due to the application of the load, the resistances of the strain gages change thereby resulting in a change in the output signal from the strain gages. The output signals from sensors 54 are coupled electrically to circuitry which conditions and/or processes the output signals to determine the weight of the patient on bed 20. For example, the output signals from sensors 54 comprise analog voltage or current signals that are fed to one or more analog-to-digital converters, in some instances after amplification, and a digital signal from the analog-to-digital converter is fed to a microcontroller and/or microprocessor which processes the digital signals in accordance with an associated software program to determine the weight of the patient. Of course, if a microcontroller having an integrated analog-to-digital converter is used, then analog signals from sensors 54, or analog signals from amplifiers coupled to sensors 54, are fed directly to the microcontroller. All types of circuitry for conditioning and/or processing output signals from sensors 54 to determine the weight of a patient are intended to fall within the scope of this disclosure.

Bed 20 has various user inputs accessible to caregivers and to patients for controlling various functions of bed 20, including controlling the weighing system of bed 20, as is well know in the art. Such user inputs are provided on siderails 40 and, in some embodiments, on footboard 44. Bed 20 also has a display which displays information, such as the weight of the patient supported on bed 20. The display is provided on one of siderails 40, 42 in some embodiments, and on footboard 44 in other embodiments. The various user inputs and the display are not illustrated, but these are well known in the art. In some embodiments, the user inputs for controlling functions of bed 20 and/or the display are provided on a hand-held controller that communicates with the main control circuitry of bed 20 either via a wired or wireless connection.

Some of the user inputs of bed 20 are used to raise or lower lift mechanisms 28, 32 to selectively raise, lower, or tilt upper frame 26 relative to base frame 22. In the illustrative example, lift mechanisms 28, 32 each comprise a telescoping column 56 having a lower segment 58 coupled to base frame 22 and an upper segment 60 that extends and retracts relative to lower segment 58 as indicated by double-headed arrow 61 shown in FIG. 1. In other embodiments, telescoping columns 56 have more than two segments. A driver such as a linear actuator, hydraulic actuator, a motorized jack screw, or the like is provided within each of columns 56 and is operable, either directly or via a linkage mechanism such as a scissors linkage, to extend and retract segment 60 relative to segment 58. In addition, lift mechanisms other than telescoping columns are within the scope of this disclosure. For example, any of a number of arrangements of links or arms may extend between frames 22, 26 and may be driven by a driver to selectively raise, lower, or tilt frame 22 relative to frame 26. In addition, one or more drivers, such as a motorized jack screw, may couple directly to frames 22, 26 and may be operated to selectively accomplish similar movement of upper frame 26 relative to base frame 22.

Lift mechanisms 28, 32 each have a frame member 62 that extends laterally relative to bed 20. That is, frame members 62 are generally perpendicular to a long dimension of bed 20 defined between head end 30 and foot end 34. Frame members 62 are each coupled to an upper region of the associated segment 60 of telescoping columns 56 as shown best in FIG. 4. In the illustrative example, sidewalls 64 of upper segments 60 each have a notch 66, one of which is shown in FIG. 4, through which the associated frame member 62 extends. Thus, end portions 68 of frame members 62 extend laterally outwardly beyond respective sides of telescoping columns 56. A pair of brackets 70 are mounted to segment 60 in the interior region thereof and one or more fasteners, such as bolts 72, one of which is shown in FIG. 4, couple frame members 62 to brackets 70. Fasteners 72 also couple a cover 73 to the upper end of telescoping columns 56 in the illustrative example.

Figure 2:
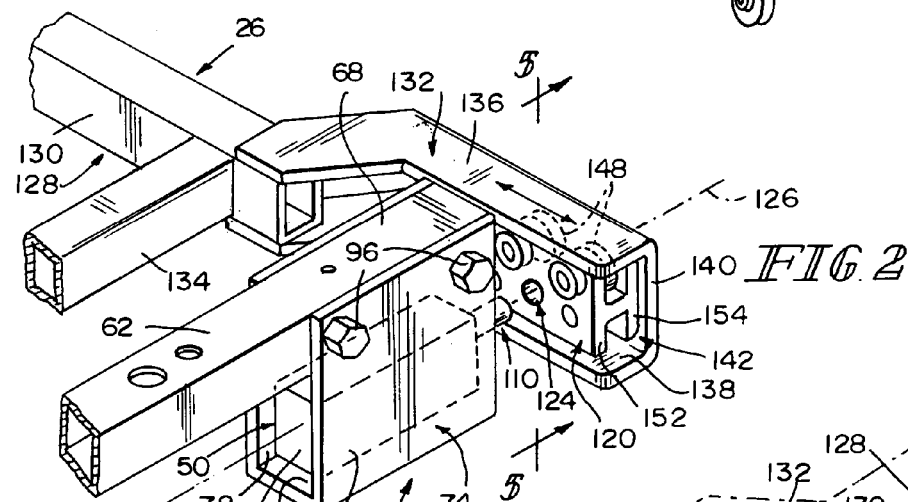
FIG. 2 is an enlarged perspective view of one of the load cell assemblies, a portion of the one of the lift assemblies, and a portion of the upper frame at a head end of the patient support apparatus showing a movable stud receiver of one of the load cell assemblies situated in a C-shaped frame member of the upper frame, the movable stud receiver having a hole aligned with a stud that extends from a load cell body (mostly in phantom) of the associated load cell assembly.
Figure 3:
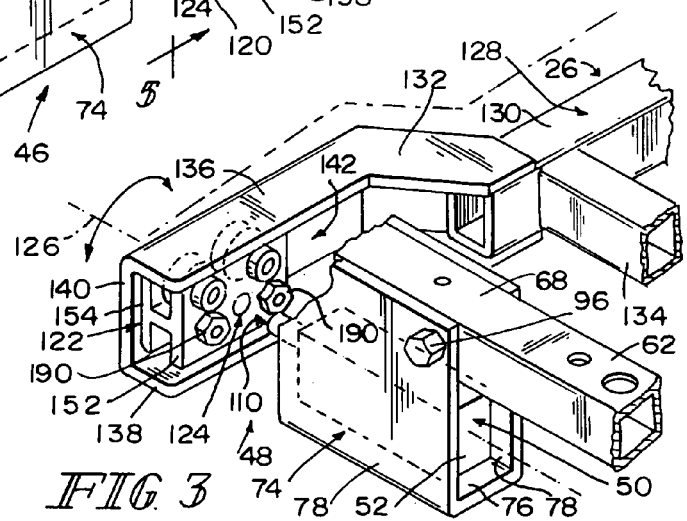
FIG. 3 is an enlarged perspective view of one of the load cell assemblies, a portion of the other of the lift assemblies, and a portion of the upper frame at a foot end of the patient support apparatus showing a fixed stud receiver situated in another C-shaped frame member of the upper frame, the fixed stud receiver having a hole aligned with a stud that extends from a load cell body (mostly in phantom) of the associated load cell assembly.
Figure 6:
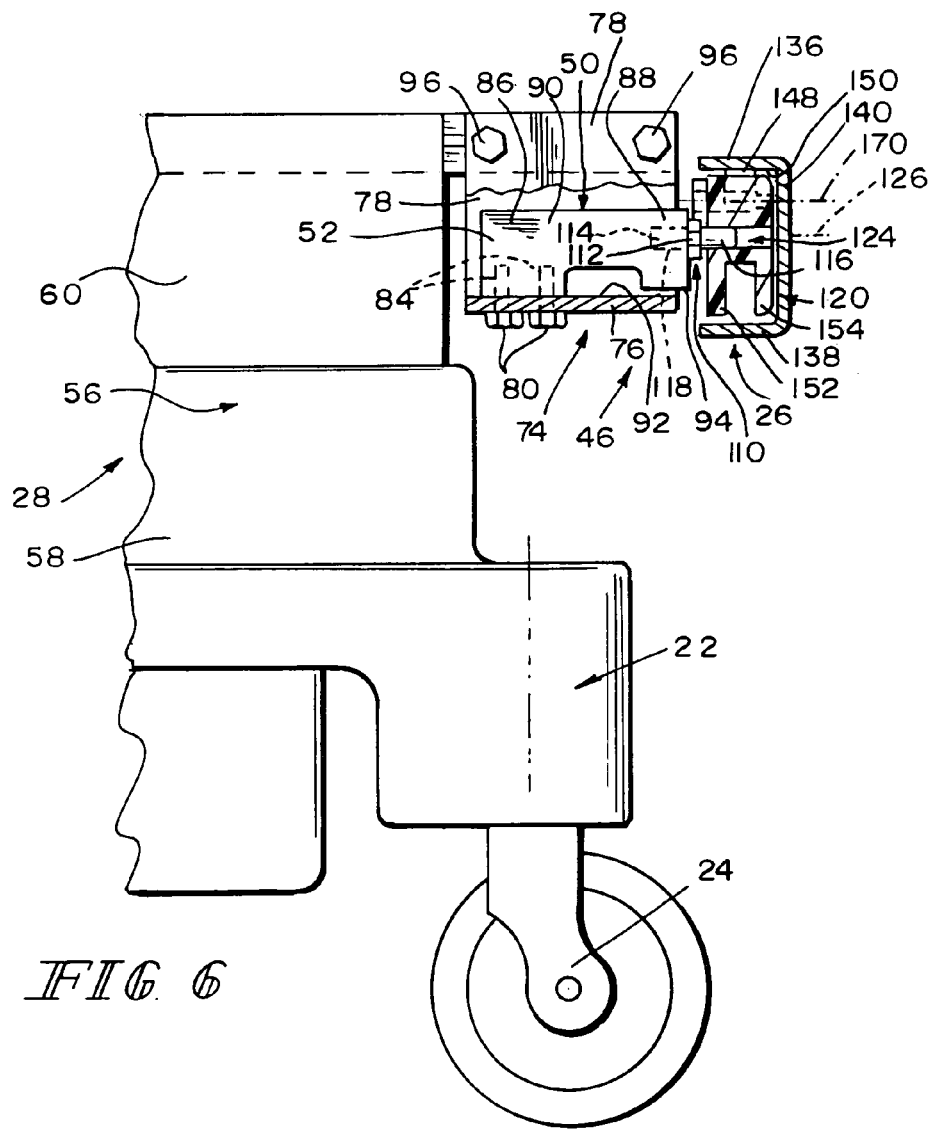
FIG. 6 is a cross sectional view, taken along line 6—6 of FIG. 5, showing the load cell body coupled to a bottom wall of a bracket that extends downwardly from a frame member of the associated lift mechanism, the frame member of the upper frame being C-shaped to define a channel in which the stud receiver is situated, and the stud extending from the load cell body into the hole of the stud receiver.

Load cell assemblies 46, 48 each include a bracket 74 that couples to respective end portions 68 of the associated frame members 62 as shown in FIGS. 2–4. Brackets 74 each have a horizontal bottom portion 76 and a pair of vertical side portions 78 extending upwardly from bottom portion 76. Thus, brackets 74 are U-shaped in cross section. In the illustrative embodiment, portions 76, 78 comprise generally flat plates. Load cell body 52 of each load cell 50 is coupled to bottom portion 76 of the respective bracket 74 by a pair of bolts or screws 80 that extend through respective apertures 82 in portions 76 and that thread into threaded holes 84 formed in load cell bodies 52 as shown in FIGS. 4 and 6.

Load cell bodies 52 are sometimes referred to in the art as load cell blocks or load beams. Illustrative load cell bodies 52 each have a first enlarged end portion 86, a second enlarged end portion 88, and a necked-down portion 90 interconnecting portions 86, 88. However, load cell bodies of all shapes and configurations are intended to fall within the scope of this disclosure. In the illustrative embodiment, threaded holes 84 are formed in end portion 86 of each load cell body 52 and screws 80 fasten end portions 86 tightly against upper surfaces 92 of portions 76 of respective brackets 74 as shown in FIG. 6. Optionally, washers or other spacers may be provided between portions 86 of bodies 52 and portions 76 of brackets 74, if desired. End portions 88 of bodies 52 are configured so that, under normal conditions in which bed 20 is supporting less than a "maximum" load, a slight gap exists between a bottom surface 94 of each of portions 88 of load cells 52 and the associated upper surfaces 92 of portions 76 of brackets 74 as also shown in FIG. 6.

As mentioned above, bodies 52 deflect in response to loads being applied to load cells 50. When bodies deflect 52, which deflection is facilitated by necked-down portion 90 having a smaller cross sectional area across the width of bodies 52 than the cross sectional area of portions 86, 88, the gap between bottom surfaces 94 of portions 88 and surfaces 92 of portions 76 of brackets 74 decreases. When the maximum load is applied to load cells 50, portions 88 of bodies 52 contact portions 76 of brackets 74 thereby preventing portion 88 from moving downwardly any further even if additional load beyond the "maximum" amount is applied to load cells 50. This feature is well known in the art and prevents overflexing of portions 90 of bodies 52 to prevent damage to portion 90 or to the sensors 54, such as strain gages, of load cells 50.

Brackets 74 are coupled to end portions 68 of respective frame members 62 by fasteners, such as illustrative bolts 96, which extend through apertures 98 in the upper regions of side portions 78 of brackets 74 and which are threaded into respective threaded apertures 100 provided in end portions 68 of frame members 62. Thus, end portions 68 of frame members 62 are situated between side portions 78 of brackets 74 and load cell bodies 52 are situated beneath end portions 68 of frame members 62 in the illustrative example. In other embodiments, brackets 74 are omitted and load cells 50 mount directly to lift mechanisms 28, 30. Load cells 50 are coupled to lift mechanisms 26, 28 so that, as lift mechanisms 26, 28 extend and retract to change the elevation of the associated end of upper frame 26, load cells 50 move upwardly and downwardly, respectively, without tilting.

When some load cells tilt, a cosine error typically is introduced in the output signals from the associated sensors which may lead to inaccuracies in the weight reading, unless the angle of tilt is sensed and appropriate cosine error compensation software is provided to correct the error. However, in the illustrative embodiment, no such angle sensors and cosine error compensation software is needed because load cells 50 do not tilt when lift mechanisms 28, 32 are raised and lowered. In other embodiments, bed 20 may have lift mechanisms that result in tilting of load cells 50 when the lift mechanisms are raised and lowered. The appropriate angle sensors and cosine error compensation software may be provided in such embodiments, if desired.

Each of load cell assemblies 46, 48 further comprises a stud 110 extending substantially horizontally from the associated load cell body 52 as shown in FIGS. 2, 3, and 6. Each illustrative stud 110, one of which is shown in FIG. 4, includes a hex nut portion 112, a threaded portion 114 on one side of portion 112, and a cylindrical portion 116 on the other side of portion 112. Portion 114 of stud 110 is threaded into a threaded hole 118 formed in load cell body 52 until hex nut portion 112 abuts a vertical end surface of portion 88 of body 52. Cylindrical portions 116 of load cell assemblies 46, 48 extend laterally with respect to bed 20 and therefore, are substantially perpendicular to the long dimension of bed 20. In other embodiments, the portion of stud 110 extending outwardly from body 50 has some other shape, such as spherical or frustoconical, in lieu of being cylindrical.

Load cell assemblies 46 near the head end 30 of bed 20 each have a movable stud receiver 120, shown, for example, in FIGS. 2 and 4, and load cell assemblies 48 near the foot end 34 of bed 20 each have a fixed stud receiver 122, shown, for example, in FIG. 3. Each of stud receivers 120, 122 has a space 124 that receives cylindrical portion 116 of associated stud 110. In the illustrative embodiment, space 124 is a cylindrical bore having a diameter that is slightly larger than the diameter of cylindrical portion 116. Thus, cylindrical portion 116 is received in space 124 with a loose fit. In FIGS. 2 and 3, load cells 50, frame members 62, brackets 74, and studs 110 are shown pulled away from stud receivers 120, 122 so that respective spaces 124 can be seen.

Each of studs 110 has a substantially horizontal axis 126 as shown in FIGS. 2, 3, and 6. When one or the other of lift assemblies 28, 32 is operated to raise or lower the respective end 30, 34 of upper frame 26 while the other of lift assemblies remains stationary, stud receivers 120, 122 rotate relative to studs 110 about respective axes 126. For example, if both lift assemblies 28, 32 are raised by a substantially equivalent amount such that upper frame 26 is supported by lift assemblies 28, 32 in a substantially horizontal position, shown in FIG. 7, lowering of lift assembly 32 while lift assembly 28 remains stationary results in movement of upper frame 26 from the horizontal position to a reverse Trendelenburg position, shown in FIG. 8. On the other hand, if lift assemblies 28, 32 support upper frame 26 in the horizontal position of FIG. 7, then lowering of lift assembly 28 while lift assembly 32 remains stationary results in movement of upper frame 26 from the horizontal position to a Trendelenburg position, shown in FIG. 9.

Frame 26 comprises a pair of longitudinal frame members 128, each of which comprises an elongated main member 130 and a pair of channel members 132 that are fastened, such as by welding, to end regions of the associated member 130 as shown in FIGS. 1–4. Frame 26 also comprises a plurality of lateral frame members 134, portions of which are shown in FIGS. 2 and 3. Each of channel members 132 has a top wall 136, a bottom wall 138, and a side wall 140 extending between walls 136, 138 as shown in FIGS. 2–6. Thus, each channel member 132 is C-shaped in cross section to define a channel 142 in which the associated stud receiver 120, 122 is situated.

Figure 7:
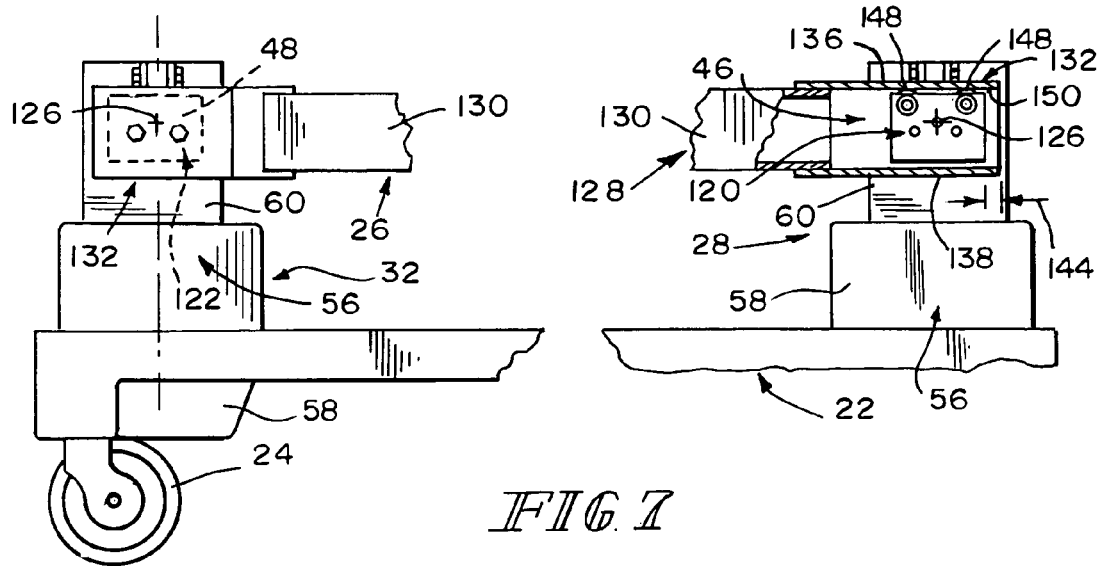
FIG. 7 is a side elevation view of part of the patient-support apparatus, with portions broken away, showing the upper frame moved to a horizontal position by the lift assemblies and the movable stud receiver on the right side of the page being in a first position a first distance away from a head end of the upper frame.
Figure 8:
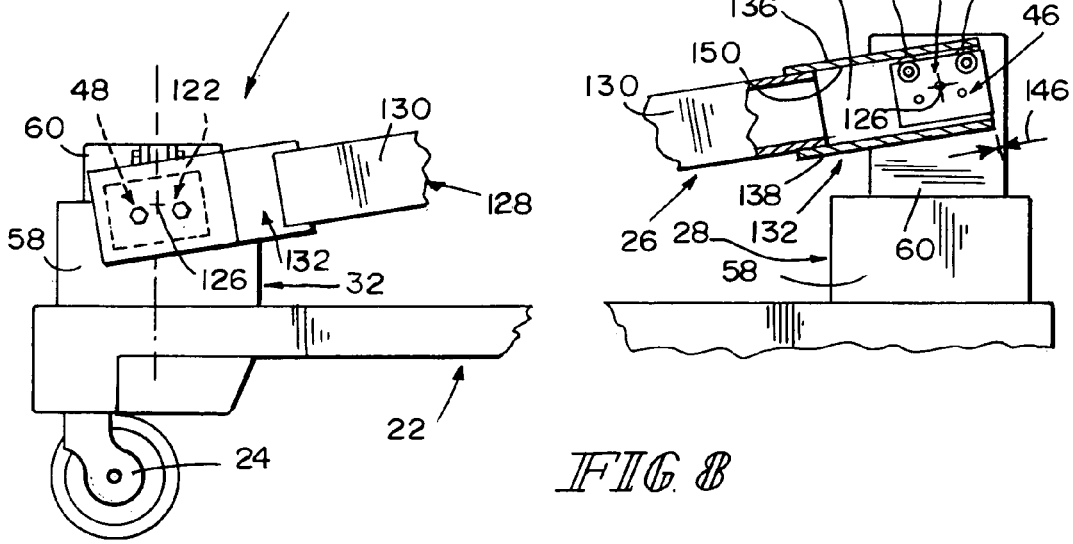
FIG. 8 is a side elevation view, similar to FIG. 7, showing the upper frame moved to a reverse Trendelenburg position by the lift assemblies and the movable stud receiver being in a second position closer to the head end of the upper frame.
Figure 9:
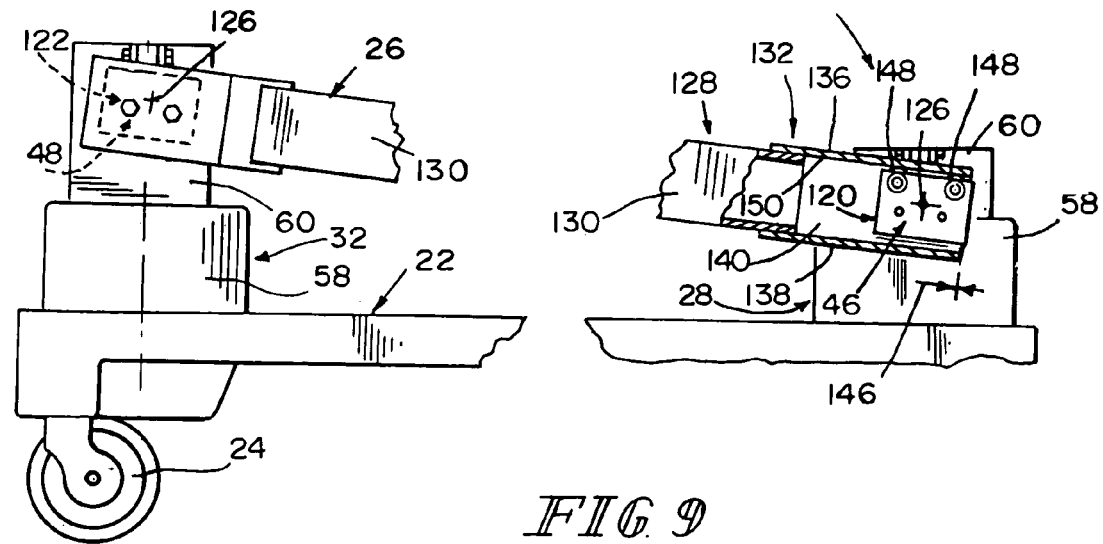
FIG. 9 is a side elevation view, similar to FIG. 8, showing the upper frame moved to a Trendelenburg position by the lift assemblies and the movable stud receiver being in the second position closer to the head end of the upper frame.

As frame 26 tilts from the horizontal position of FIG. 7 to either the reverse Trendelenburg position of FIG. 8 or the Trendelenburg position of FIG. 9, stud receivers 120, 122 tilt along with frame 26 and rotate about axes 126 of studs 110 as mentioned above. Stud receivers 122 are fixed in position relative to frame 26 whereas stud receivers 120 are able to move relative to frame 26. Thus, when frame 26 is in the horizontal position, the head end of stud receivers 120 are a first distance 144 away from the head end of channel members 132 as shown in FIG. 7. When frame 26 is in the reverse Trendelenburg position or in the Trendelenburg position stud receivers 120 are a second distance 146 away from the head end of channel members 132 as shown in FIGS. 8 and 9. Second distance 146 is smaller than first distance 144. In the illustrative example, the angle of tilt of frame 26 relative to horizontal is substantially the same in the reverse Trendelenburg position as in the Trendelenburg position and therefore, distance 146 is substantially the same regardless of whether frame 26 is in the Trendelenburg or reverse Trendelenburg position. In other embodiments, however, frame 26 may tilt more or less than the illustrative embodiment and the maximum angle of tilt in opposite directions may not be substantially equivalent.

To reduce friction between stud receivers 120 and channel members 132 of frame 26 during relative movement between stud receivers 120 and frame 26, load cell assemblies 46 each have a set of rollers 148 coupled to stud receivers 120 as shown in FIGS. 2-9. Rollers 148 each contact an undersurface 150 of the top wall 136 of each associated channel member 132 and roll upon the respective undersurface 150 as frame 26 tilts relative to base frame 22. In other embodiments, a set of rollers are coupled to frame 26 and contact associated moveable stud receivers. By providing rollers 148 between stud receivers 120 and frame 26, stick seize between stud receivers 120 and frame 26 is significantly reduced, or altogether eliminated, as are side loads on studs 110, thereby improving the accuracy of load cell assemblies 46, 48.

Figure 5:
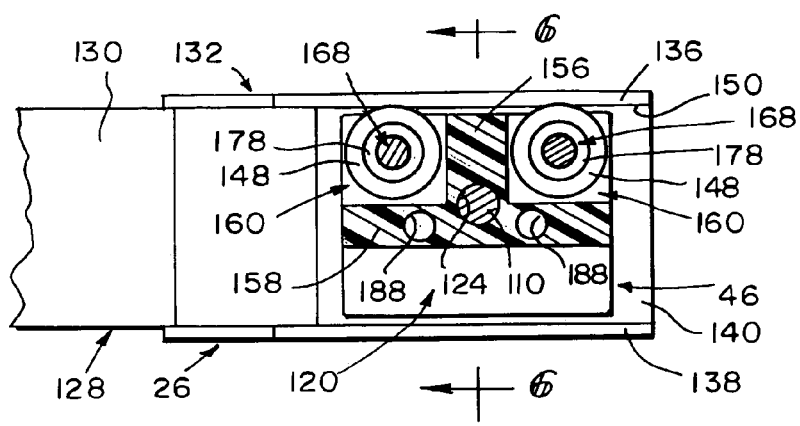
FIG. 5 is a cross sectional view, taken along line 5—5 of FIG. 2, showing a pair of rollers coupled to one of the stud receivers, the stud receiver having a vertical wall between the rollers and a horizontal wall underlying the rollers, the hole which receives the stud being situated generally in the area where the vertical and horizontal walls meet, and the rollers contacting an upper wall of a frame member of the upper frame.

Illustrative stud receivers 120 each comprise a first exterior vertical wall 152 and a second exterior vertical wall 154 that is spaced from, but substantially parallel with, wall 152 as shown in FIGS. 2, 4, and 6. Illustrative stud receivers 120 also each comprise an interior vertical wall 156 and an interior horizontal wall 158 as shown in FIGS. 4 and 5. Walls 156, 158 interconnect and span the gap between walls 152, 154. Rollers 148 are received in roller-receiving pockets 160 that are defined in stud receivers 120 between associated walls 152, 154 on either side of the associated wall 156 and above the associated wall 158. While a majority of each roller 148 is situated inside the associated pocket 160, a slight amount of the top portion of each roller 148 extends upwardly beyond the top surface of stud receivers 120. In the illustrative embodiment, each of pockets 160 is open at the top surface and at respective end surface of the associated stud receiver. Thus, in the illustrative embodiment, two pockets 160 are provided in each stud receiver 120 to accommodate two rollers 148. In other embodiments, more or less than two rollers 148 may be coupled to each stud receiver 120.

Stud receivers 120 comprise a pair of cylindrical bosses 162 appended to an outer surface of wall 152 as shown in FIG. 4. A first set of holes 164 extend through bosses 162 and through wall 152 and a second set of holes 166 extend through wall 154. Each hole 166 is aligned with, but is slightly smaller in diameter than, an associated one of holes 164. A set of shafts 168 extend through pockets 160 across the gap defined between walls 152, 154. Rollers 148 are each mounted on a respective one of shafts 168 for rotation about a respective roller axis 170. Each of axes 170 is substantially horizontal and substantially parallel with the axes 126 of studs 110 as shown in FIG. 6. Each bore 124 is formed in the associated stud receiver 120 through wall 152 and into an area where walls 156, 158 meet as shown in FIG. 5. Thus, roller axes 170 define a plane that is situated above the associated axis 126.

Shafts 168 each have a large diameter portion 172 and a small diameter portion 174 as shown in FIG. 4. Each shaft 168, therefore, has an annular shoulder 176 extending between portions 172, 174. Each portion 174 is at one end of the associated shaft 168 and is sized for receipt in an associated one of holes 166 provided in the corresponding wall 154. An opposite end of each shaft 168 is provided by an end region of the associated portion 172 and is sized for receipt in an associated one of holes 164 provided in bosses 162 and the corresponding wall 152. Each shoulder 176 abuts a respective wall 154. In some embodiments, bosses 162 are heat staked over the ends of portions 172 of shafts 168 to retain shafts 168 in place relative to stud receivers 120. In other embodiments, shafts 168 are retained in place in some other manner, such as by press fitting in holes 164 and/or holes 166 or by use of retaining clips or pins that are coupled to shafts 168 and/or to stud receivers 120.

To reduce friction between rollers 148 and shafts 168, a set of DU bushings 178 are interposed between each roller 148 and the respective shaft 168 as shown in FIGS. 4 and 5. Each bushing 178 is press fit into a bore 180 of the corresponding roller 148. In addition, each bushing 178 has a bore 182 in which portion 172 of an associated shaft 168 is received with a loose fit. In alternative embodiments, bushings 178 are replaced by bearings with rolling elements, such as ball bearings, needle bearings, cylindrical roller bearings, or the like. It has been found that using bearings with rolling elements in load cell assemblies 46 improves the accuracy of the weight reading as compared to load cell assemblies 46 using bushings 178, but bushings 178 are usually less expensive than bearings with rolling elements.

Stud receivers 122 each have a shape that is substantially similar to the shape of stud receivers 120. However, stud receivers 122 do not have any rollers 148, shafts 168, or bushings 178 coupled thereto. To fix stud receivers 122 in place relative to frame 26, a set of fasteners, such as bolts 184, shown in FIG. 4, are inserted through associated holes 186 in walls 140 of channel members 132 and through holes 188 in stud receivers 122, and then associated nuts 190, shown in FIG. 3, are threaded onto the ends of bolts 188. Illustrative holes 188 extend through walls 152, 154, 158 of stud receivers 120, 122. Bolts 184 are shown in FIG. 4 to indicate that, if desired, stud receivers 120 can be fixed to frame 26 at the head end thereof and stud receivers 122 at the foot end of frame 26 can have rollers 148 coupled thereto. In other words, either of stud receivers 120, 122 can be fixed to frame 26 so long as the other of stud receivers 120, 122 is movable relative to frame 26. Thus, stud receivers 120, 122 serve as carriers to carry frame 26, one of stud receivers 120, 122 being a fixed carrier and the other of stud receivers 120, 122 being a rolling or movable carrier.

In the illustrative example of load cell assemblies 46, 48, load cell bodies 52, brackets 74, studs 110, rollers 148, shafts 168, bushings 178, and fasteners 80, 96, 184, 190 are made of metal material and stud receivers 120, 122 are made of a plastic material. For example, in one embodiment, load cell bodies 52 are aluminum, studs 110 are steel, such as 4140 C.D.S. steel or 4142 C.D.S. steel, rollers 148 are steel, and stud receivers 120, 122 are M90 Acetal material. In other embodiments, stud receivers 120, 122 may have main bodies made of a metal material, or any other material having suitable load-carrying capability, and may have plastic liners that are received in cavities provided in the main bodies and that have bores 124 provided in the liners to receive associated studs 110. In still further embodiments, stud receivers 120, 122 may be made of metal and studs 110 may have a coating of antifriction material which serves as a liner between the studs and the associated stud receivers.

Figure 10:
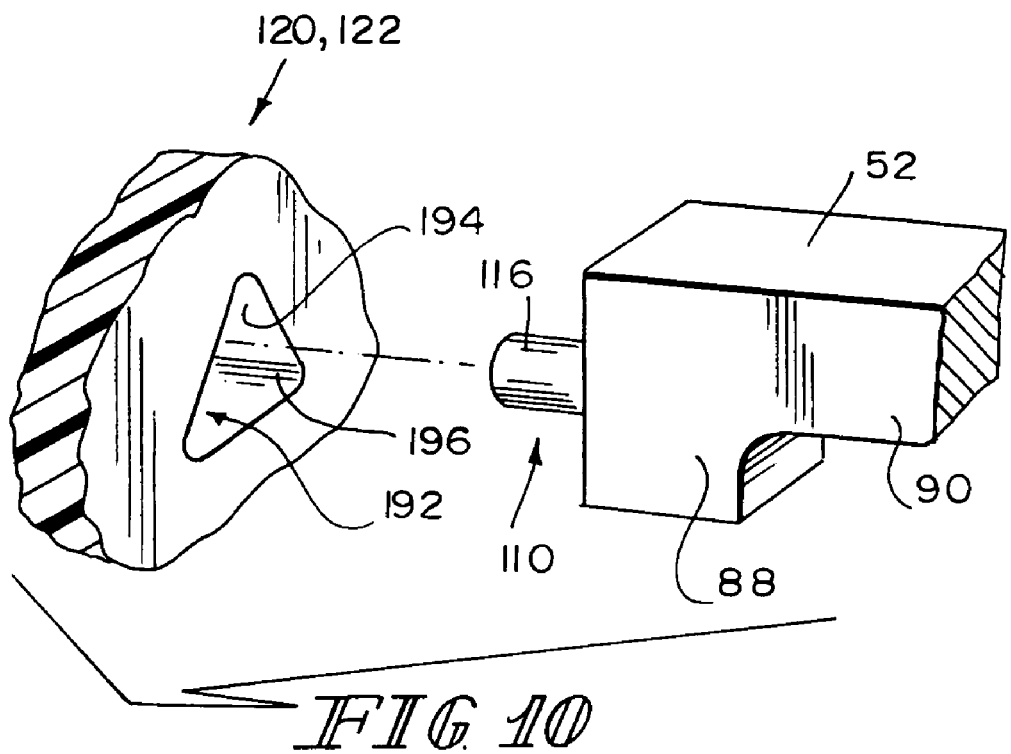
FIG. 10 is an exploded perspective view showing a portion of another embodiment of a stud receiver having a triangular hole and showing a portion of an associated cell body having a stud with a cylindrical portion aligned for insertion into the triangular hole.
Figure 11:
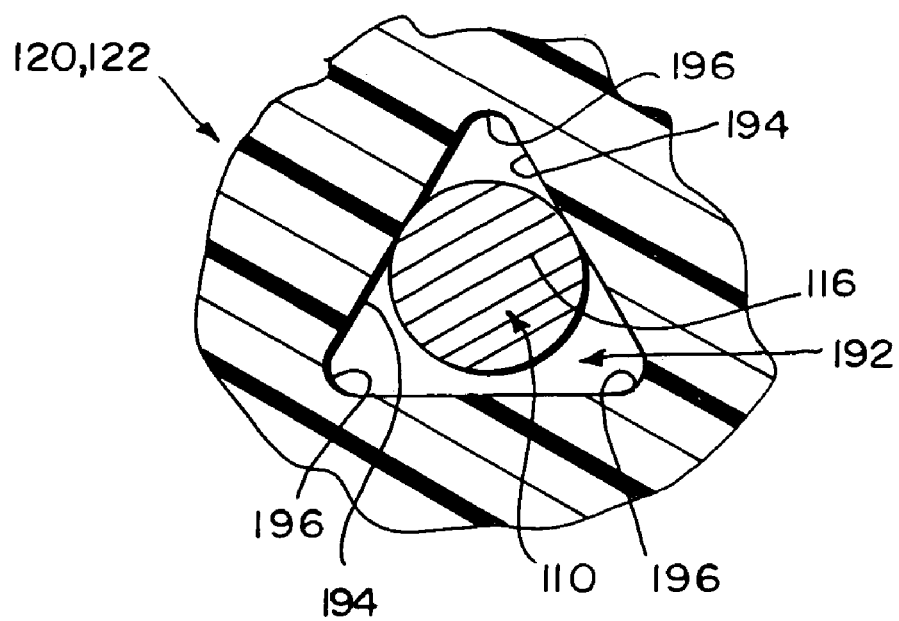
FIG. 11 is a cross sectional view through a portion of the stud receiver showing the cylindrical portion of the stud received in the triangular hole.

In an alternative embodiment, stud receivers 120, 122 each have a triangular hole or bore 192 as shown in FIGS. 10 and 11. Each hole 192 is defined, in part, by a pair of inclined surfaces 194. Part of cylindrical portions 116 of studs 110 are received in bores 192 and contact the associated pair of inclined surfaces 194. Thus, in the embodiment of FIGS. 10 and 11, cylindrical portions 116 of studs 110 engage stud receivers 120, 122 along two lines of contact. As compared to the embodiment of FIGS. 1–9, in which studs 110 engage stud receivers 120, 122 along one line of contact, the stress levels between cylindrical portions 116 of studs 110 and any one of inclined surfaces 194 are less than the stress levels between cylindrical portions 116 of studs 110 and the cylindrical surface that defines bores 124 in stud receivers 120, 122. In the illustrative example, apexes or corners 196 of each triangular hole 192 are rounded and are spaced from the associated stud 110. In still other embodiments, inclined surfaces 194 may be provided as part of holes or bores that are square, diamond-shaped, hexagonal, octagonal, and so on. While illustrative surfaces 194 are substantially flat, in some embodiments, surfaces 194 may be either concave or convex, as desired, yet still provide two lines of contact with cylindrical portions 116 of studs 110. In alternative embodiments, studs 110 may have spherical portions providing two points of contact with surfaces 194.

Those skilled in the art will appreciate that, although load cell assemblies 46, 48 are described herein as being coupled to frame 26 and to frame members 62 of lift mechanisms 28, 32, it is within the scope of this disclosure for load cell assemblies 46, 48 to couple to any type of structure or support. Therefore, the term "structure" as used in the claims is intended to be non-limiting and to mean any and all types of structures such as frames, bases, supports, members, pedestals, decks, surfaces, plates, panels, beams, and so forth.

Although certain illustrative embodiments have been described in detail above, variations and modifications exist within the scope and spirit of this disclosure as described and as defined in the following claims.

The invention claimed is:

1. A combination comprising
   a first structure,
   a second structure,
   a load cell coupled to the first structure, the load cell comprising a load cell body and a sensor, the sensor providing an output signal indicative of an amount of load applied to the load cell,
   a stud extending away from the load cell body,
   a stud receiver having a space in which a portion of the stud is received, and
   a set of rollers coupled to one of the stud receiver and the second structure and contacting the other of the stud receiver and the second structure.

2. The combination of claim 1, wherein the space comprises a substantially cylindrical bore in which the portion of the stud is received.

3. The combination of claim 2, wherein at least part of the portion of the stud received in the substantially cylindrical bore is substantially cylindrical and has a stud diameter smaller than a bore diameter of the substantially cylindrical bore.

4. The combination of claim 1, wherein the space comprises a substantially triangular bore in which the portion of the stud is received.

5. The combination of claim 4, wherein at least part of the portion of the stud received in the substantially triangular bore is substantially cylindrical.

6. The combination of claim 5, wherein the substantially triangular bore is defined, in part, by two inclined surfaces that engage different portions of the stud along a pair of contact lines.

7. The combination of claim 4, wherein the substantially triangular bore has three apexes that are spaced from the stud.

8. The combination of claim 1, wherein the stud receiver rotates about the stud when the second structure tilts relative to the first structure.

9. The combination of claim 1, wherein the set of rollers roll upon the second structure when the second structure tilts relative to the first structure.

10. The combination of claim 1, wherein the stud extends substantially horizontally relative to the load cell body along a first substantially horizontal axis and each roller of the set of rollers is rotatable about a respective second substantially horizontal axis.

11. The combination of claim 10, wherein the set of rollers comprises at least two rollers and the second substantially horizontal axes of the at least two rollers define a plane situated above the first substantially horizontal axis.

12. The combination of claim 1, wherein the stud receiver comprises a pair of roller-receiving pockets, the set of rollers comprises a pair of rollers, and at least a portion of each roller of the pair of rollers is received in a respective pocket of the pair of roller-receiving pockets.

13. The combination of claim 12, wherein the stud receiver comprises a horizontal wall underlying the pair of roller-receiving pockets and a vertical wall situated between the pair of roller-receiving pockets.

14. The combination of claim 12, wherein the roller-receiving pockets are each open at a top surface and at respective end surfaces of the stud receiver.

15. The combination of claim 1, wherein the stud receiver has a top surface and a part of each roller of the set of rollers extends upwardly beyond the top surface of the stud receiver.

16. The combination of claim 1, wherein the stud receiver has a pair of vertical walls and at least part of each roller of the set of rollers are situated between the pair of vertical walls.

17. The combination of claim 16, further comprising a set of shafts extending across a gap defined between the pair of vertical walls and each roller of the set of rollers is mounted for rotation on a respective shaft of the set of shafts.

18. The combination of claim 17, further comprising a set of bushings, each bushing being interposed between a respective roller of the set of rollers and the associated shaft.

19. The combination of claim 17, further comprising a set of bearings with rolling elements, each bearing being interposed between a respective roller of the set of rollers and the associated shaft.

20. The combination of claim 17, wherein a first vertical wall of the pair of vertical walls has a first set of holes, a second vertical wall of the pair of vertical walls has a second set of holes, each shaft has a first end received in a respective hole of the first set of holes, and each shaft has a second end received in a respective hole of the second set of holes.

21. The combination of claim 20, wherein each of the first holes has a first diameter that is larger than a second diameter of each of the second holes and each shaft of the set of shafts has a shoulder that contacts the second vertical wall.

22. The combination of claim 20, wherein the stud receiver has a set of shaft retainers coupled to a first vertical wall of the pair of vertical walls and each shaft retainer is heat staked over an end of a respective shaft.

23. The combination of claim 1, further comprising a bracket that couples the load cell body to the first structure.

24. The combination of claim 23, wherein the bracket has a bottom portion that underlies the load cell body and at least one side portion that extends between the bottom portion and the first structure, the at least one side portion being fastened to the first structure, and the load cell body being fastened to the bottom portion.

25. The combination of claim 23, wherein the bracket comprises a bottom portion and two side portions extending upwardly from the bottom portion such that the bracket is U-shaped in cross section, the load cell body sits atop the bottom portion, and at least part of the first structure is situated above the load cell body and between the two side portions of the bracket.

26. The combination of claim 1, wherein the stud receiver is made of a plastic material and the stud is made of a metal material.

27. The combination of claim 1, wherein the first structure comprises a lift mechanism of a patient support apparatus and the second structure comprises a frame of the patient support apparatus.

28. The combination of claim 27, wherein the patient support apparatus has a length dimension defined between a head end and a foot end of the patient support apparatus and the stud has an axis that is substantially perpendicular to the length dimension of the patient support apparatus.

29. The combination of claim 27, wherein the lift mechanism is extendable and retractable to change an elevation of the frame and the load cell body is coupled to the lift mechanism so as to move upwardly and downwardly without tilting as the lift mechanism extends and retracts.

30. The combination of claim 27, wherein the lift mechanism comprises a telescoping column and a first frame member coupled to an upper region of the telescoping column, an end portion of the first frame member extends from the telescoping column toward a second frame member of the upper frame, and the load cell body is coupled to the end portion of the first frame member.

31. The combination of claim 27, wherein the upper frame comprises a frame member having a C-shaped cross section defining a channel in which the stud receiver is situated.

32. The combination of claim 31, wherein the frame member comprises a top wall, a bottom wall, and a side wall extending between the top and bottom walls and wherein the set of rollers contact an undersurface of the top wall.

33. The combination of claim 27, wherein the lift mechanism is operable to change the elevation of the frame and, as the frame changes elevation, the set of rollers roll on the frame.

34. The combination of claim 1, wherein the space of the stud receiver is defined, in part, by a pair of inclined surfaces, at least a portion of the stud is received in the hole and contacts the pair of inclined surfaces.

35. The combination of claim 34, wherein the space of the stud receiver comprises a triangular hole that is bounded, in part, by the pair of inclined surfaces.

36. The combination of claim 35, wherein corners of the triangular hole are rounded.

37. The combination of claim 1, wherein the sensor comprises at least one of following: a strain gage, a resistive element, a capacitor, a transducer using shaped magnetic field technology, an optical sensor, a transducer that emits electromagnetic energy, a transducer that receives electromagnetic energy, or a linear variable displacement transducer.

38. The combination of claim 1, wherein the stud has a cylindrical portion.

39. The combination of claim 1, wherein the stud has a spherical portion.

40. The combination of claim 1, wherein the load cell body has a threaded hole and the stud has a threaded portion that threads into the threaded hole.

* * * * *